Figure 7:
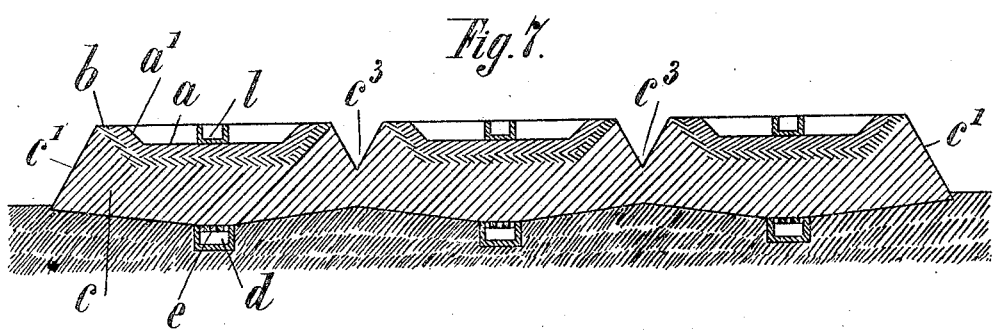

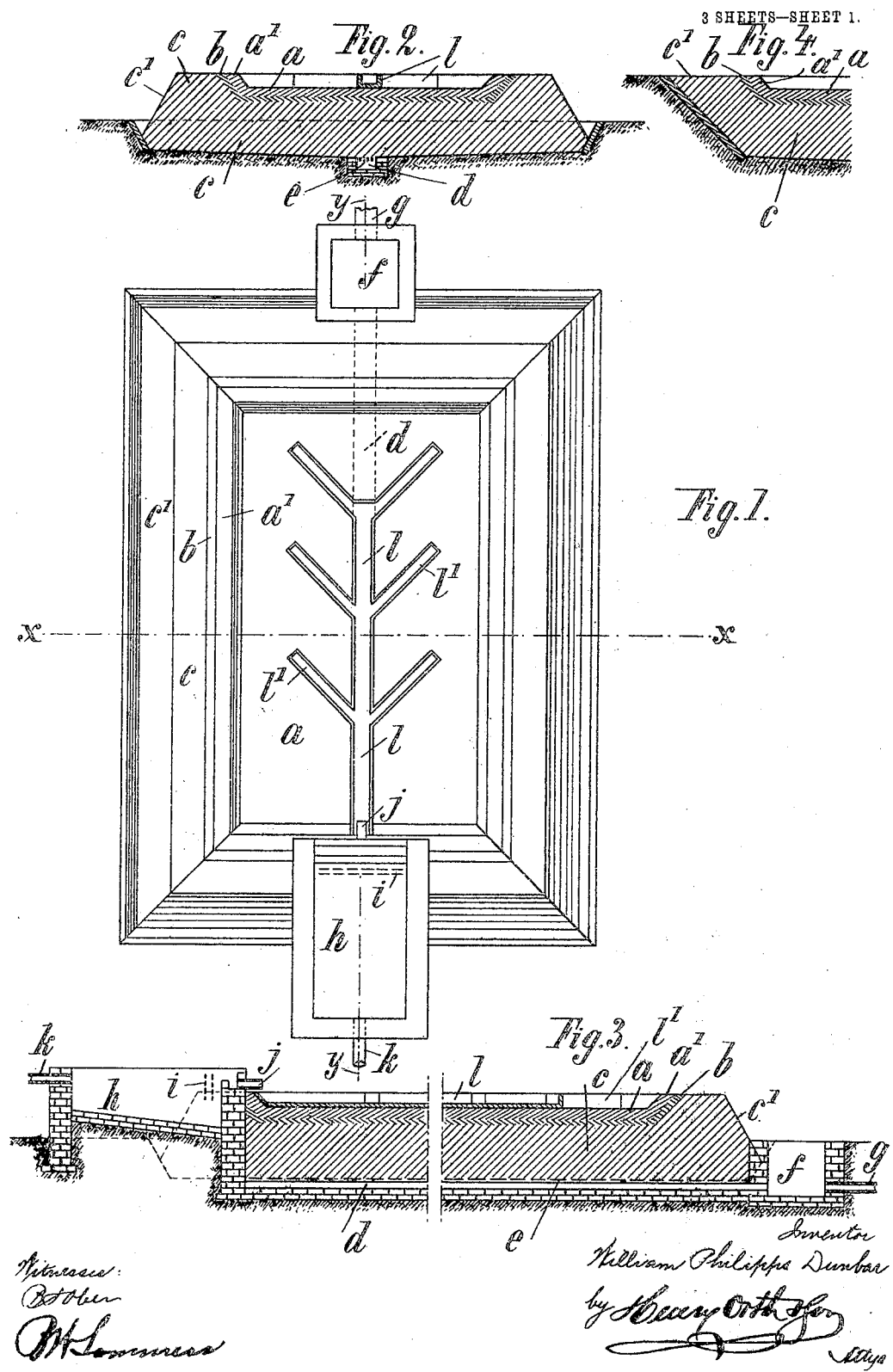

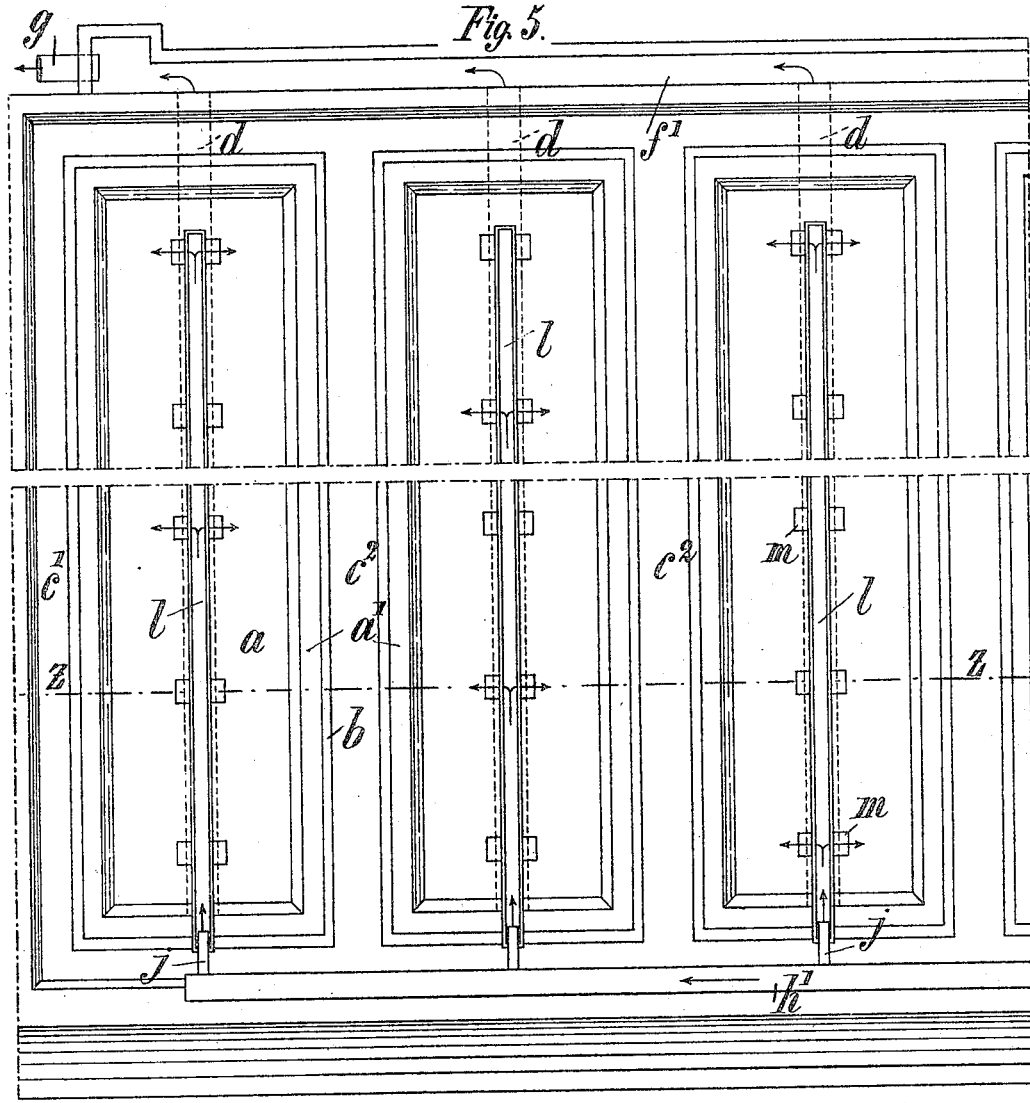
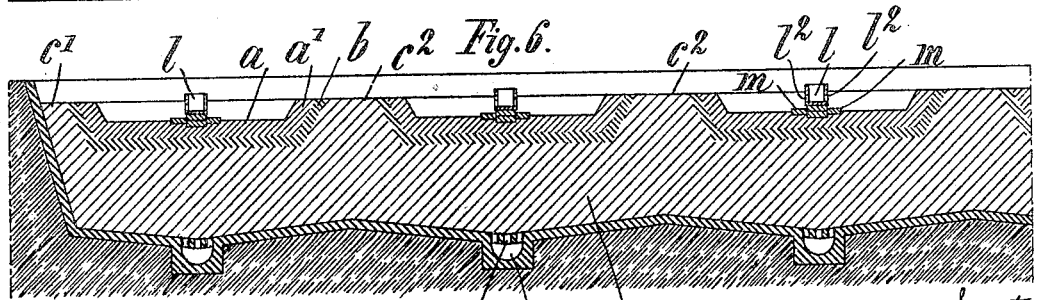

UNITED STATES PATENT OFFICE.

WILLIAM PHILIPPS DUNBAR, OF HAMBURG, GERMANY.

METHOD OF BIOLOGICAL PURIFICATION OF LIQUIDS.

No. 807,667.　　　　Specification of Letters Patent.　　　　Patented Dec. 19, 1905.

Application filed June 9, 1904. Serial No. 211,784.

*To all whom it may concern:*

Be it known that I, WILLIAM PHILIPPS DUNBAR, doctor of medicine, a citizen of the German Empire, and a resident of Hamburg, Germany, have invented a certain new and useful Improved Method of Biological Purification of Liquids, of which the following is a specification.

This invention relates to an improved method for the oxidation or biological treatment of liquids for the purification of waste waters and particularly sewage-waters.

According to the processes hitherto employed the crude sewage has in the majority of cases to be subjected to preparatory treatment more or less inconvenient and costly before it is passed into a percolating-bed or contact-bed, or both, as the case may be.

Now the object of this invention is to provide an improved method of continuous biological purification of sewage and other liquids and an improved form of percolating-bed and mode of operation of same, whereby the sewage may be effectually purified without preparatory treatment in a simple, continuous, and economical manner and without having recourse to mechanical methods of regulation and distribution. According to this novel method the unprepared sewage is passed directly into a percolating-bed and is effectively purified in a continuous manner by subjecting it to the continuously-operative processes of absorption, biological action, and oxidation in a plant suitably designed to bring these operations forcibly and effectively into play.

The improved method excels in respect of successfully purifying a given volume of crude sewage at a greater rate per unit of ground area occupied and usually at lower initial and working costs than in the case of other existing methods.

The means employed for carrying the invention into practice consists, broadly, of an oxidation-body constructed, for example, of coke, slag, or other suitable material, the upper surface of this body being provided either wholly or in part with a layer of fine granular material, underneath which may be arranged one or more layers of somewhat coaser granular formation. Below these is arranged an understructure composed of larger pieces— say of a size of about six inches in diameter and upward. The whole bed may be sunk below or built from the ground-level, and a channel is provided running longitudinally of the bed and provided with perforated coverings for the drainage of the effluent and the supply of air to the bed. The ground on either side of the channel is sloped to drain toward same. The channel may terminate in an inspection-chamber connected to a drain or ditch for the disposal of the effluent. The fine upper layers of the bed are arranged with upwardly-extending sides to prevent the overflow of liquid to the understructure without passing through the fine layers. The liquid may be passed on to the top layer from a receiving chamber or tank, which may also serve the purpose of screening the liquid from floating detritus.

A most important feature in the relative arrangement of the fine and coarse layers according to this invention is the fact that a portion or portions of the coarse understructure are exposed to the atmosphere, thereby affording a free passage for air-currents and also an outlet to the current of air which enters the bed from the bottom channel and is maintained by the difference of temperature within and without the bed, owing to the heat generated by the actions occurring in the bed.

A further feature is that the finely-granular constitution of the upper layer serves to distribute the liquid to be purified in a finely-divided state, such as in the form of films or drops, uniformly over the surface of the oxidation body and also furnishes a certain resistance which prevents more of the liquid to be treated from passing through the bed than the latter is capable of purifying or oxidizing without overtaxing its capacity. At the same time processes of absorption and decomposition take place in it, which result in relieving the understructure. Further, undissolved materials are retained upon the surface or in the layer of fine material and prevented from reaching the understructure.

The function of the intermediate layer or layers is to prevent the washing away of the material of the finer top layer into the understructure. In addition to this the uniform distribution of the liquid which has been begun in the top layer is further developed in this transition layer.

The beds may conveniently be constructed of a length of fifty meters or more and from eight to ten meters or more wide. The liquid to be purified may be supplied through channels provided at intervals with lateral outlets. Under each of these outlets bricks, plates, or other suitable devices may be laid upon the top layer in order to prevent the washing away of this layer by the stream of liquid and to distribute this latter in the form of sheets.

In order that my invention may be readily understood and carried into effect, I will now proceed to describe the same fully, with reference to the accompanying drawings, in which—

Figure 8:
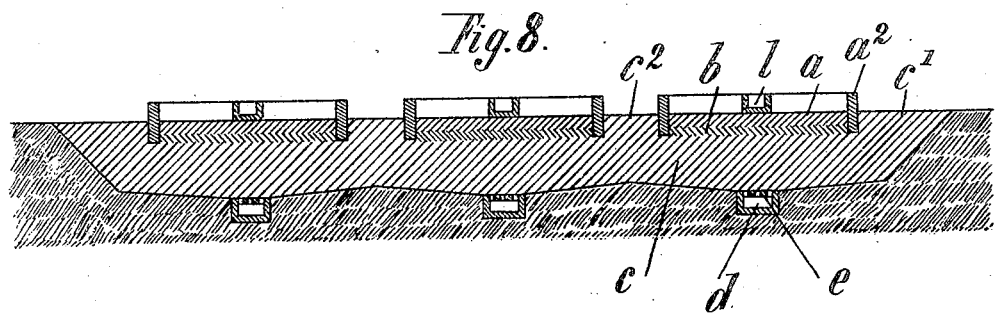

Figure 1 represents in ground plan, and Figs. 2 and 3 in sectional elevations on lines $xx$ and $yy$, respectively, the improved plant. Fig. 4 shows a sectional elevation of a modified arrangement of the bed. Fig. 5 is, on a somewhat larger scale, a ground plan showing a number of such beds in conjunction and a modified form of certain parts. Fig. 6 is a sectional elevation on the line $zz$, Fig. 5. Fig. 7 is a sectional elevation illustrating a further-modified arrangement of the bed; and Fig. 8 is a sectional elevation of the bed, showing a modified form of the upwardly-extending sides for the top layer.

Similar letters of reference refer to similar parts throughout the figures.

Referring to the drawings, $a$ is the fine upper layer with upwardly-extending sides $a'$.

$b$ is the transition layer, and $c$ the understructure of larger-sized material, the portions of the understructure exposed to atmosphere and allowing a free air-passage being marked $c'$.

$d$ is the channel for air-inlet and effluent drainage with perforated covers $e$.

$f$ is the inspection-chamber with drain $g$.

$h$ is the reception-chamber for the liquid, which enters by pipe $k$ and is screened at $i$, passing out through pipe $j$ into a suitable distributing-trough or overfall-channel $l$, having distributing branch channels $l'$, whence it flows onto the bed $a$ and is evenly distributed through the bed, passing out through channel $d$ in a purified condition.

In Fig. 4 is shown a modified arrangement of the bed in which the whole body is sunk into the ground. In this case the exposed portion of the body $c$ is shown at $c'$ and is disposed horizontally. I may use any number of such beds in conjunction, as indicated, for instance, in Figs. 5 and 6. The liquid to be purified is supplied through a conduit-pipe $h'$ and pipes or nozzles $j$, leading into the distributing-channels $l$, which latter are provided with holes or outlets $l^2$. Under each of these outlets bricks $m$ (plates or other suitable devices) are laid upon or partly in the top layer $a$ in order to prevent the washing away of this layer by the stream of liquid and to distribute this latter in the form of sheets. The exposed interspaces $c^2$ of the understructure $c$ may be arranged as shown.

In the modification shown in Fig. 7 the exposed interspaces of the several beds may be arranged as shown at $c^3$. Furthermore, it is evident that the upwardly-extending sides $a'$ need not necessarily be composed of the same material as the layer $a$, but may be arranged in a manner similar to the sides $a^2$, (shown in Fig. 8,) of any suitable material or form, without departing from the nature of the invention. After being solidified the undissolved material or mud retained upon the surface of the bed or beds is removed and placed at a proper place for further drying. A number of layers of such mud may be placed one upon the other. Owing to the fact that in removing each layer of mud a portion of the finely-granulated top layer remains adhering thereto and is so left, between the separate layers of the piled-up solidified masses of mud finely-granulated substances are obtained which produce a draining effect and permit of the further drying of the mud by evaporation and the supply of air requisite therefor. The waste or loss in the top layer of each bed is replaced as required.

In accordance with the manner in which the liquid is to be treated, or the concentration of the liquids to be purified, or the conditions laid down as to the degree of purity of the effluent, the size of the granules and also the thickness of the top layer will be arrived at for each case. According as the top layer is higher and its granules finer the greater will be the degree of purity obtained; but, of course, the quantitative efficiency will fall correspondingly. Consequently by suitably dimensioning the top layer the plant may be suited to varying quantitative and qualitative requirements.

The efficiency of the operation as conducted by the passage of the liquid through the novel apparatus or plant is based upon the fact that the liquid in its suitable quantitative regulation and distribution throughout the bed is vigorously exposed to absorption, oxidation, and biological influences.

By "absorption" is here meant the physical property peculiar to such substances as those of which the bed is composed of giving rise in certain organic compounds and gases in contact therewith to a state of abnormal molecular activity, resulting in some cases in a change of molecular state and resolution into other and simpler compounds. Similarly as regards the well-known oxidizing efficiency of coke and like bodies this may be said to be due to a like physical action owing to the peculiar surface formation of the bodies, which induces in the atmospheric oxygen a state of molecular instability and accompanied by great readiness to enter into combination with substances which in passing through the bed are exposed to this oxidizing influence.

It should be noted that the continuous maintenance of the action of absorption, as also of biological activity, is dependent upon the continuous supply of air to all parts of the bed. It is owing to the due appreciation of the phenomena of absorption, oxidation, and biological influences and the provision of means for their efficient utilization in the improved plant that the successful results obtained are ascribed.

Having fully described my invention, what I claim, and desire to secure by Letters Patent, is—

Purifying sewage by biological action, which consists in placing the material on a percolating-bed increasing in coarseness from the surface downward, distributing the liquid portions over the bed by the action of the topmost layer, and producing a dripping of the liquid portions between the large pieces of the lowermost layer, the sides of the layers of filtering materials of the bed being directly exposed to the atmosphere and causing a natural circulation of air from the sides of the bed to the interior and out again by the heat set up by the oxidation in the bed, whereby the liquid dropping between the coarse pieces is surrounded by air and the use of conduits and forcing apparatus is avoided.

WILLIAM PHILIPPS DUNBAR.

Witnesses:
  MAX KAEMPFF,
  E. H. L. MUMMENHOFF.